(12) United States Patent
Hillman et al.

(10) Patent No.: US 9,706,172 B1
(45) Date of Patent: *Jul. 11, 2017

(54) ROOF INSPECTION DEVICES, METHODS, AND SYSTEMS

(75) Inventors: James P. Hillman, San Antonio, TX (US); Cynthia Blasing, Hondo, TX (US); Damien Brunet, Schertz, TX (US); Dan D. Cable, Garden Ridge, TX (US); Adolfo J. Fernandez, San Antonio, TX (US); Jeffrey A. Kreth, San Antonio, TX (US); Shane Osborne, Marion, TX (US); Robert A. Pacheco, San Antonio, TX (US); Renee Sokolowski, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 917 days.

This patent is subject to a terminal disclaimer.

(21) Appl. No.: 13/298,083

(22) Filed: Nov. 16, 2011

Related U.S. Application Data

(60) Provisional application No. 61/532,470, filed on Sep. 8, 2011.

(51) Int. Cl.
*H04N 7/18* (2006.01)

(52) U.S. Cl.
CPC ............. *H04N 7/18* (2013.01); *H04N 7/185* (2013.01)

(58) Field of Classification Search
CPC .......... H04N 7/181; H04N 7/183; H04N 7/18; H04N 7/188; G08B 13/19656; F24J 2200/04; G06F 17/5004; G06Q 30/0283; Y02B 10/12; Y04S 50/14

USPC ....... 348/143; 703/1; 705/400; 707/E17.044, 707/999.104, 999.107

See application file for complete search history.

(56) References Cited

U.S. PATENT DOCUMENTS

| | | | | |
|---|---|---|---|---|
| 4,027,528 A * | 6/1977 | Tyree | ................... | G01N 29/265 73/620 |
| 4,312,162 A | 1/1982 | Medney | | |
| 5,065,249 A | 11/1991 | Horn | | |
| 5,399,009 A | 3/1995 | Hiner | | |
| 6,056,450 A * | 5/2000 | Walling | ................. | F16M 11/10 352/243 |
| 7,869,944 B2 | 1/2011 | Deaton et al. | | |
| 2002/0097321 A1 * | 7/2002 | McBride | ............ | G02B 23/2476 348/148 |
| 2006/0158549 A1 | 7/2006 | Digweed et al. | | |
| 2007/0053680 A1 * | 3/2007 | Fromm | ................. | F16M 11/14 396/420 |

(Continued)

OTHER PUBLICATIONS

"Infrared Camera Rentals" [Retrieved on Sep. 29, 2011], Retrieved from internet <http://www.atlas-inspection.com/infrared-camera-rentals.html>.

(Continued)

*Primary Examiner* — Dakshesh Parikh
(74) *Attorney, Agent, or Firm* — Baker & Hostetler LLP

(57) ABSTRACT

The present disclosure describes roof inspection devices, methods, and systems. One roof inspection device includes a pole, a camera coupled to an end of the pole and configured to capture an image of a roof, and a number of attachments coupled to the pole and configured to stabilize the pole on the roof or other elevated surface.

8 Claims, 3 Drawing Sheets

(56) References Cited

U.S. PATENT DOCUMENTS

| | | | |
|---|---|---|---|
| 2008/0162380 A1* | 7/2008 | Suga | G06F 17/5004 |
| | | | 705/400 |
| 2009/0216552 A1 | 8/2009 | Watrous | |
| 2009/0265193 A1* | 10/2009 | Collins et al. | 705/4 |
| 2012/0076485 A1* | 3/2012 | Zwahr | G03B 17/561 |
| | | | 396/425 |
| 2012/0211978 A1 | 8/2012 | Gardiner | |
| 2012/0322368 A1* | 12/2012 | Desai | H04W 76/023 |
| | | | 455/41.1 |

OTHER PUBLICATIONS

"Remote Visual Inspection—Overview" [Retrieved on Sep. 29, 2011], Retrieved from internet <http://www.ashtead-technology.com/us/RemoteVisual/Content/Overview.html>.

"Rovver 225" [Retrieved on Sep. 29, 2011], Retrieved from internet < http://www.ge-mcs.com/en/remote-visual-inspection/robotic-crawlers/rovver-225.html>.

"Telescopic Inspection Camera" [Retrieved on Sep. 29, 2011], Retrieved from internet <http://www.ukinspectioncamera.co.uk/acatalog/Telescopic_Camera_Pixie_Click.html>.

* cited by examiner

ROOF INSPECTION DEVICES, METHODS, AND SYSTEMS

BACKGROUND

In some circumstances, an insurance company may need to inspect the roof, walls, windows, or any other elevated surface not accessible from the ground of a building (e.g., a house and/or dwelling) covered by an insurance policy issued by the insurance company. For example, if the roof of a building covered by an insurance policy is damaged due to, for instance, a storm, wind, hail, falling tree(s), water, and/or fire, among other causes of damage, the insurance company may need to inspect the damaged roof as part of a claims process. For instance, the insurance company may need to assess the condition of the roof (e.g., the extent and/or amount of the damage to the roof) in order to determine whether a loss exists and/or estimate the cost of repairing the damage.

In some previous roof inspection approaches, a human representative (e.g., a claims adjuster) of the insurance company may need to physically climb on to the roof (e.g., using a ladder) and/or walk around on the roof in order to inspect the roof. However, such a roof inspection method can be dangerous for the claims adjuster. Further, such a roof inspection method can be costly and/or time consuming for the insurance company.

DETAILED DESCRIPTION

Figure 1A:
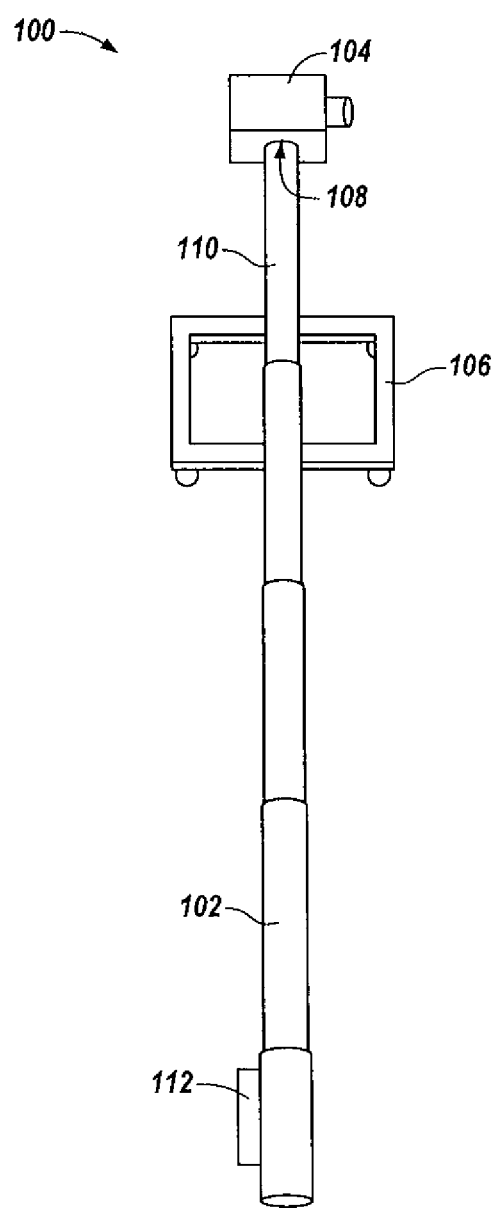
FIGS. 1A and 1B illustrate a system for inspecting a roof in accordance with one or more embodiments of the present disclosure.

The present disclosure describes roof inspection devices, methods, and systems. One or more embodiments include a pole, a camera coupled to an end of the pole and configured to capture an image of a roof, and a number of attachments coupled to the pole and configured to stabilize the pole on the roof or other elevated surface.

Roof inspection devices, methods, and/or systems in accordance with the present disclosure can be safer than previous roof inspection approaches (e.g, roof inspection approaches in which a person physically climbs on to the roof and/or walks around on the roof). Further, roof inspection devices, methods, and/or systems in accordance with the present disclosure can be less costly and/or less time consuming than previous roof inspection approaches.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1A and/or FIG. 1B, and a similar element may be referenced as 206 in FIG. 2.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

As used herein, "a" or "a number of" something can refer to one or more such things. For example, "a number of attachments" can refer to one or more attachments.

Figure 1B:
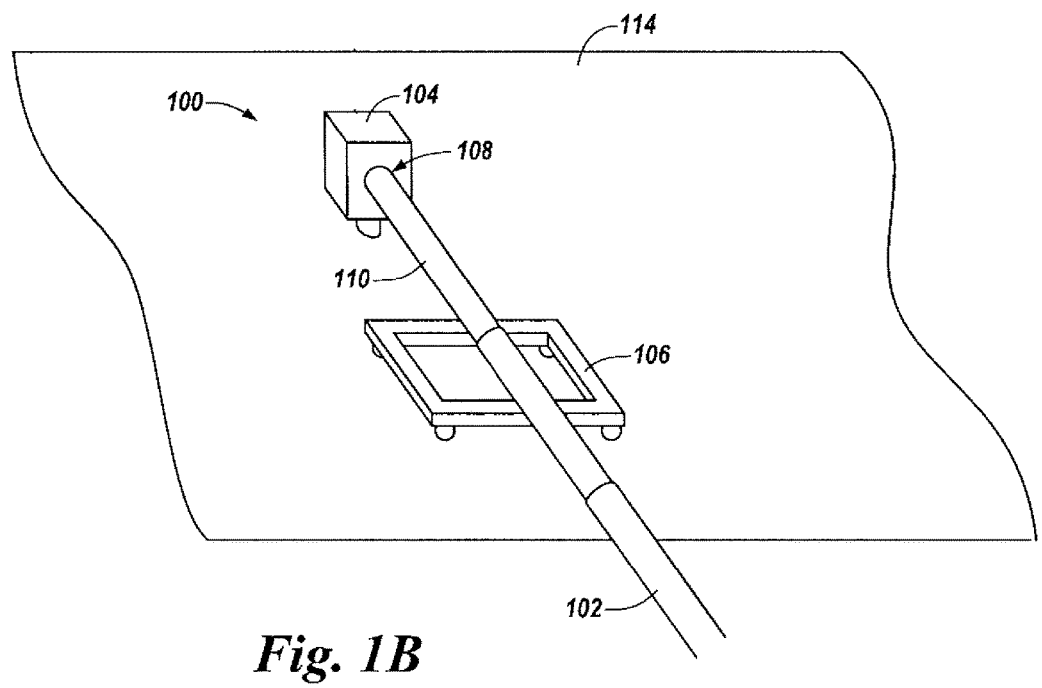

FIG. 1A illustrates a system 100 for inspecting a roof in accordance with one or more embodiments of the present disclosure. FIG. 1B illustrates a portion of the roof inspection system 100 while roof inspection system 100 is in use on (e.g., is being used to inspect) a roof 114. Roof 114 can be, for example, the roof of a building (e.g., a house and/or dwelling) covered by an insurance policy issued by an insurance company. Additionally and/or alternatively, roof 114 can be and/or include any elevated surface that is not accessible from the ground, such as, for instance, a wall(s) or window(s).

As shown in FIGS. 1A and 1B, roof inspection system 100 includes a pole 102. Pole 102 can be, for example, an extendable pole. Pole 102 can be extended (e.g., partially or fully extended) while roof inspection system 100 is being used to inspect a roof (e.g., roof 114), as illustrated in FIG. 1B. For example, in the embodiments illustrated in FIGS. 1A and 1B, pole 102 is in a fully extended position. Pole 102 can be retracted (e.g., not extended) when roof inspection system 100 is not in use. For example, pole 102 can be retracted while roof inspection system 100 is being stored and/or transported.

Pole 102 can be, for example, a non-conductive pole. For example, pole 102 can include a non-conductive (e.g., insulator) material such as, for instance, a non-metal material.

As shown in FIGS. 1A and 1B, roof inspection system 100 includes a camera 104 coupled to an end 108 (e.g., the top) of pole 102. Camera 104 can be, for example, a light weight and/or high resolution digital camera. Camera 104 can be, for example, a remotely controllable and/or remotely operable camera. That is, camera 104 can be controlled and/or operated from a location other than the location of the camera, as will be further described herein.

Camera 104 can capture (e.g., produce, generate, and/or acquire) a number of images (e.g., a number of digital images) of a roof (e.g., roof 114) that is being inspected. For example, camera 104 can capture a number of images of a roof that has been damaged due to, for instance, a storm, wind, hail, falling tree(s), water, and/or fire, among other causes of damage. Camera 104 can capture images of a portion(s) of the roof (e.g., the damaged portion(s)) and/or images of the entire roof.

In some embodiments, camera 104 can be a releasable camera. That is, camera 104 can be released from the end 108 of pole 102. In such embodiments, after camera 104 is released from the end 108 of pole 102, camera 104 can move around on the roof to capture images of different parts of the roof. For example, camera 104 can move around on the roof to capture images of portions of the roof that may not be accessible to pole 102 (e.g., portions of the roof that may not be accessible to camera 104 when it is attached to the end 108 of pole 102). For instance, camera 104 be moved to capture an image over an edge(s) of the roof (e.g., to peak over the edge of the roof).

As shown in FIGS. 1A and 1B, roof inspection system 100 includes an attachment 106 coupled to pole 102 (e.g., to a shaft 110 of pole 102). Although the embodiments illustrated in FIGS. 1A and 1B include one attachment 106 coupled to pole 102, embodiments of the present disclosure are not so limited, and can include any number (e.g., more than one) of attachments 106 coupled to pole 102.

Attachment 106 can be used to stabilize pole 102 (e.g., prevent pole 102 from moving) while pole 102 is on the roof (e.g., while camera 104 is capturing images of the roof) and/or to move pole 102 along the roof. Accordingly, attachment 106 can provide consistent distances for pole 102 that can result in camera 104 capturing standardized images of the roof. Attachment 106 will be further described herein (e.g., in connection with FIG. 2).

As shown in FIG. 1A, roof inspection system 100 includes a mobile device 112. Mobile device 112 can be, for example, a mobile phone, a smart phone, a personal digital assistant (PDA), a smart device, etc. Mobile device 112 can be a hotspot that can create its own network (not shown in FIG. 1A).

As used herein, a "network" (e.g., the network created by mobile device 112) can provide a communication system that directly or indirectly links two or more computers and/or peripheral devices (e.g., mobile device 112 and camera 104) and allows users to access resources on other computing devices and exchange messages with other users. A network can allow users to share resources on their own systems with other network users and to access information on centrally located systems or on systems that are located at remote locations.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Mobile device 112 (e.g., a user of mobile device 112) can communicate with, control, and/or operate camera 104 via the network created by mobile device 112. For example, mobile device 112 can instruct camera 104 to capture an image of a roof (e.g., roof 114) and send (e.g., transmit) the captured image to mobile device 112. Mobile device 112 can receive the captured image of the roof sent from camera 104 and/or display the captured image (e.g., to a user of mobile device 112), as will be further described herein. As an additional example, mobile device 112 can release camera 104 from pole 102 and move camera 104 around on the roof after camera 104 is released from pole 102.

In some embodiments, mobile device 112 can send the captured image of the roof to an additional computing device (not shown in FIG. 1A or 1B). The additional computing device can be, for example, a mobile device (e.g., a mobile phone, a smart phone, a personal digital assistant (PDA), a smart device, etc.), a laptop computer, or a desktop computer, among other types of computing devices. The additional computing device can be located at or near the location of roof inspection system 100, or at a location remote to roof inspection 100 (e.g., at a building of the insurance company).

In the embodiment illustrated in FIG. 1A, mobile device 112 is coupled to pole 102 (e.g., near the bottom of pole 102). However, embodiments of the present disclosure are not so limited. For example, in some embodiments, mobile device 112 may not be coupled to pole 102. Further, in some embodiments, mobile device 112 can be releasable from pole 102. Mobile device 112 will be further described herein (e.g., in connection with FIG. 3).

Roof inspection system 100 can, for example, be used by a claims adjuster of an insurance company or a technician to inspect the roof of a building (e.g., roof 114) covered by an insurance policy issued by the insurance company. For example, the claims adjuster can use roof inspection system 100 to inspect a roof that has been damaged due to, for instance, a storm, wind, hail, falling tree(s), water, and/or fire, among other causes of damage, as part of a claims process. For instance, the claims adjuster may use roof inspection system 100 to assess the condition of the roof (e.g., the extent and/or amount of the damage to the roof) in order to determine whether a loss exists and/or estimate the cost of repairing the damage.

By using roof inspection system 100 to inspect the roof, the claims adjuster can inspect the roof and other places not accessible from the ground without having to physically climb on to the roof and/or walk around on the roof. For example, the claims inspector may be able to inspect the roof from the ground. In contrast, in some previous roof inspection approaches, the claims adjuster may need to physically climb on to a roof (e.g., using a ladder) and/or walk around on the roof in order to inspect the roof. Accordingly, using roof inspection system 100 to inspect a roof can be safer, less costly, and/or less time consuming than such previous roof inspection approaches.

Figure 2:
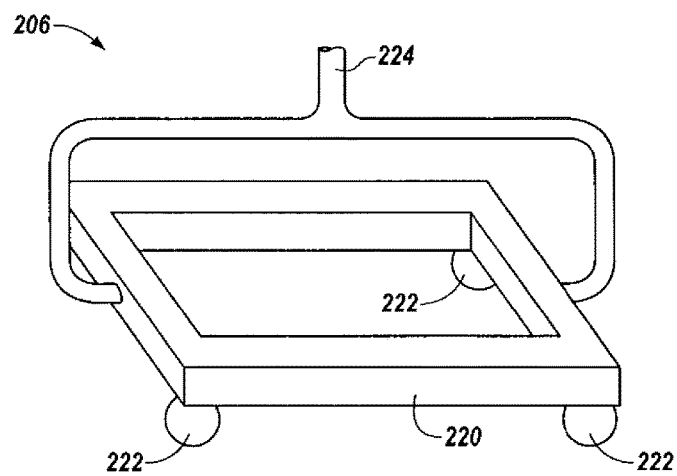
FIG. 2 illustrates an attachment of a roof inspection system in accordance with one or more embodiments of the present disclosure.

FIG. 2 illustrates an attachment 206 of a roof inspection system in accordance with one or more embodiments of the present disclosure. Attachment 206 can be, for example, attachment 106 of roof inspection system 100 previously described in connection with FIGS. 1A and 1B.

As shown in FIG. 2, attachment 206 includes a base member 220. Base member 220 can have a gap, space, and/or opening therein, as illustrated in FIG. 2. In the embodiment illustrated in FIG. 2, base member 220 is rectangular shaped. However, embodiments of the present disclosure are not limited to the rectangular shape illustrated in FIG. 2 for base member 220. For example, base member 220 can be any rectangular and/or non-rectangular shape.

As shown in FIG. 2, attachment 206 includes a number of wheels 222 coupled to the bottom of base member 220. In the embodiment illustrated in FIG. 2, attachment 206 includes a wheel 222 coupled to each corner of base member 220. However, embodiments of the present disclosure are not limited to a particular number of wheels or wheel location.

As shown in FIG. 2, attachment 206 includes a coupling member 224 coupled to base member 220. Coupling member 224 can couple base member 220 to a pole (e.g., pole 102 previously described in connection with FIG. 1) of the roof inspection system. Embodiments of the present disclosure are not limited to the particular coupling member 224 illustrated in FIG. 2, and can include any type of coupling member that can couple base member 220 to the pole of the roof inspection system.

Figure 3:
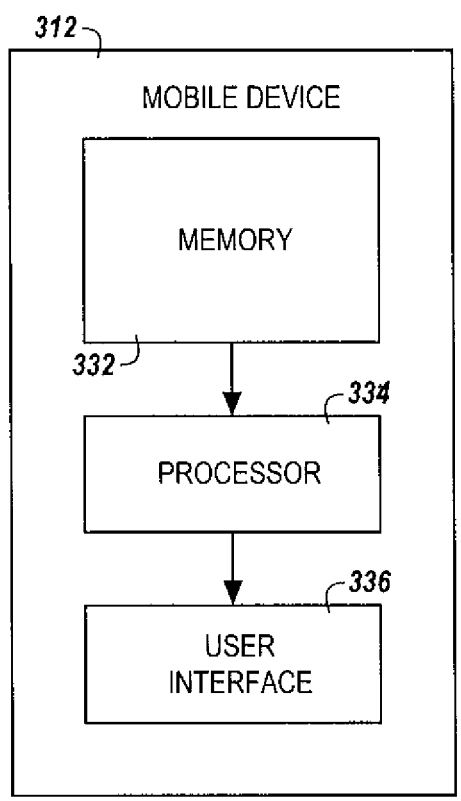
FIG. 3 illustrates a mobile device of a roof inspection system in accordance with one or more embodiments of the present disclosure.

FIG. 3 illustrates a mobile device 312 of a roof inspection system in accordance with one or more embodiments of the present disclosure. Mobile device 312 can be, for example, mobile device 112 of roof inspection system 100 previously described in connection with FIGS. 1A and 1B.

As shown in FIG. 3, mobile device 312 includes a memory 332 and a processor 334 coupled to memory 332. Memory 332 can be any type of storage medium that can be accessed by processor 334 to perform various examples of the present disclosure. For example, memory 332 can be a non-transitory computer readable medium having computer readable instructions (e.g., computer program instructions) stored thereon that are executable by processor 334 to perform various examples of the present disclosure. That is, processor 334 can execute the executable instructions stored in memory 332 to perform various examples of the present disclosure.

Memory 332 can be volatile or nonvolatile memory. Memory 332 can also be removable (e.g., portable) memory, or non-removable (e.g., internal) memory. For example, memory 332 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 332 is illustrated as being located in mobile device 312, embodiments of the present disclosure are not so limited. For example, memory 332 can also be located internal to another computing resource (e.g., enabling computer readable instructions to be downloaded over the Internet or another wired or wireless connection).

In some embodiments, memory 332 can have computer readable instructions stored thereon that are executable by processor 334 to communicate with, control, and/or operate camera 104 previously described in connection with FIGS. 1A and 1B. For example, memory 332 can have computer readable instructions stored thereon that are executable by processor 334 to instruct camera 104 to capture an image of a roof (e.g., roof 114 previously described in connection with FIG. 1B) and send (e.g., transmit) the captured image to mobile device 312. As an additional example, memory 332 can have computer readable instructions stored thereon that are executable by processor 334 to release camera 104 from pole 102 previously described in connection with FIGS. 1A and 1B and move camera 104 around on the roof after camera 104 is released from pole 102.

As shown in FIG. 3, mobile device 312 includes a user interface 336. User interface 336 can provide (e.g., display and/or present) and/or receive information (e.g., data and/or images) to and/or from a user (e.g., operator) of mobile device 312. For example, user interface 336 can include a screen (e.g., viewfinder) that can display images to the user of mobile device 312.

As an example, user interface 336 can display the image of the roof captured and sent to mobile device 312 by camera 104. In some embodiments, user interface 336 can display the image of the roof as camera 104 captures the image. That is, the user of mobile device 312 can view the image as it is being captured by camera 104 (e.g., the user can see what camera 104 sees).

The user of mobile device 312 can be, for instance, a claims adjuster of an insurance company who is performing an inspection of a roof, as previously described herein, or a technician trained to use the device for inspections. By viewing the image of the roof on user interface 336 of mobile device 312, the claims adjuster can inspect the roof and other places not accessible from the ground without having to physically climb on to the roof and/or walk around the roof, as previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the disclosed embodiments of the present disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A roof inspection device, comprising:
   a pole adapted to extend to a height of a roof;
   a camera coupled to an end of the pole, the camera having a first width perpendicular to a longitudinal axis of the pole; and
   an attachment coupled to the pole and arranged to stabilize the pole on the roof when the pole is arranged such that the camera is positioned to capture an image of the roof and a second end of the pole is held by a user on a ground surface, the attachment comprising:
   a coupling member coupled to the pole;
   a base member coupled to the coupling member; and
   a plurality of wheels coupled to the base member and arranged to engage the roof,
   the base member comprising a rectangular frame having a central gap and a second width perpendicular to the longitudinal axis, the second width greater than the first width,
   wherein the camera is configured to send the image to a mobile device over a wireless network created by the mobile device.

2. The roof inspection device of claim 1, wherein the camera is a remotely operable camera.

3. The roof inspection device of claim 1, wherein the pole is an extendable pole.

4. The roof inspection device of claim 1, wherein the pole is a non-conductive pole.

5. The roof inspection device of claim 1, wherein the camera is releasable from the end of the pole.

6. A roof inspection system, comprising:
a pole adapted to extend to a height of a roof;
a camera coupled to an end of the pole, the camera having a first width perpendicular to a longitudinal axis of the pole;
an attachment coupled to the pole and arranged to stabilize the pole on the roof when the pole is arranged such that the camera is positioned to capture an image of the roof and a second end of the pole is held by a user on a ground surface, the attachment comprising:
 a coupling member coupled to the pole;
 a base member coupled to the coupling member; and
 a plurality of wheels coupled to the base member and arranged to engage the roof,
 the base member comprising a rectangular frame having a central gap and a second width perpendicular to the longitudinal axis, the second width greater than the first width; and
a mobile device communicatively coupled to the camera, the mobile device configured to:
 cause the camera to capture the image of the roof;
 create a wireless network; and
 receive the image from the camera via the wireless network.

7. The roof inspection system of claim 6, wherein the mobile device is configured to instruct the camera to capture the image.

8. The roof inspection system of claim 6, wherein the mobile device is coupled to the pole.

* * * * *